United States Patent
Qi

(10) Patent No.: US 9,888,366 B2
(45) Date of Patent: *Feb. 6, 2018

(54) APPARATUS, SYSTEM AND METHOD OF COMMUNICATING MULTICAST TRAFFIC

(71) Applicant: INTEL CORPORATION, Santa Clara, CA (US)

(72) Inventor: Emily H. Qi, Camas, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,883

(22) Filed: Nov. 9, 2016

(65) Prior Publication Data

US 2017/0111772 A1 Apr. 20, 2017

Related U.S. Application Data

(63) Continuation of application No. 14/582,959, filed on Dec. 24, 2014, now Pat. No. 9,521,192.

(60) Provisional application No. 62/072,649, filed on Oct. 30, 2014.

(51) Int. Cl.
*H04W 4/06* (2009.01)
*H04W 72/04* (2009.01)
*H04W 8/00* (2009.01)
*H04L 12/721* (2013.01)
*H04L 12/18* (2006.01)

(52) U.S. Cl.
CPC ............ *H04W 4/06* (2013.01); *H04L 45/26* (2013.01); *H04W 8/005* (2013.01); *H04W 72/0446* (2013.01); *H04L 12/189* (2013.01)

(58) Field of Classification Search
CPC ... H04W 4/06; H04W 72/0446; H04W 8/005; H04L 45/26
See application file for complete search history.

(56) References Cited

U.S. PATENT DOCUMENTS

| | | |
|---|---|---|
| 8,363,581 B2 | 1/2013 | Kim et al. |
| 8,892,722 B1 | 11/2014 | Kopikare et al. |
| 9,521,192 B2 | 12/2016 | Qi |
| 2005/0036469 A1 | 2/2005 | Wentink |
| 2007/0008922 A1 | 1/2007 | Abhishek et al. |

(Continued)

OTHER PUBLICATIONS

IEEE STD 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

Primary Examiner — Ronald B Abelson
(74) Attorney, Agent, or Firm — Shichrur & Co.

(57) ABSTRACT

Some demonstrative embodiments include apparatuses, systems and/or methods of Peer to Peer communication. For example, a device may include a controller to generate a Peer to Peer discovery frame including at least one Multicast attribute, the Multicast Attribute including an address field and one or more attribute fields, the address field to indicate a plurality of devices; and a radio to transmit the Peer to Peer discovery frame, and to transmit multicast traffic to the plurality of devices according to the one or more attribute fields.

34 Claims, 5 Drawing Sheets

(56) References Cited

U.S. PATENT DOCUMENTS

| | | |
|---|---|---|
| 2007/0104138 A1 | 5/2007 | Rudolf et al. |
| 2007/0211680 A1 | 9/2007 | Laroia et al. |
| 2008/0031193 A1 | 2/2008 | Laroia et al. |
| 2009/0016456 A1 | 1/2009 | Li et al. |
| 2009/0310517 A1* | 12/2009 | Narayanan .............. H04L 67/16 370/254 |
| 2011/0082940 A1 | 4/2011 | Montemurro et al. |
| 2011/0306301 A1 | 12/2011 | Lubetzky et al. |
| 2012/0230280 A1 | 9/2012 | Chandra et al. |
| 2013/0322297 A1 | 12/2013 | Dominguez |
| 2013/0343283 A1 | 12/2013 | Laroia et al. |
| 2015/0139213 A1 | 5/2015 | Abraham et al. |
| 2016/0127459 A1 | 5/2016 | Qi |

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.
U.S. Appl. No. 14/570,008, filed Dec. 15, 2014, 55 pages.
Office Action for U.S. Appl. No. 14/570,008, dated Jun. 3, 2016, 27 pages.
Notice of Allowance for U.S. Appl. No. 14/582,959, dated Aug. 8, 2016, 21 pages.
Office Action for U.S. Appl. No. 14/570,008, dated Jan. 11, 2017, 19 pages.
Advisory Action for U.S. Appl. No. 14/570,008, dated Apr. 13, 2017, 6 pages.
Office Action for U.S. Appl. No. 14/570,008 dated Nov. 2, 2017, 18 pages.

* cited by examiner

APPARATUS, SYSTEM AND METHOD OF COMMUNICATING MULTICAST TRAFFIC

CROSS REFERENCE

This application is a Continuation Application of U.S. patent application Ser. No. 14/582,959, filed Dec. 24, 2014, which in turn claims the benefit of and priority from U.S. Provisional Patent Application No. 62/072,649 entitled "Apparatus, System and Method of Peer to Peer Communication", filed Oct. 30, 2014, the entire disclosures of which are incorporated herein by reference.

TECHNICAL FIELD

Embodiments described herein generally relate to Peer to Peer communication.

BACKGROUND

A Peer to Peer (PTP) communication technology, for example, Wireless Fidelity (WiFI) Direct (WFD) Peer to Peer (P2P), may provide an easy and convenient manner to share, show, print and/or synchronize content, e.g., wherever users go.

There is a need for communication schemes to enable efficient, improved, and/or optimal communication between peer to peer devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
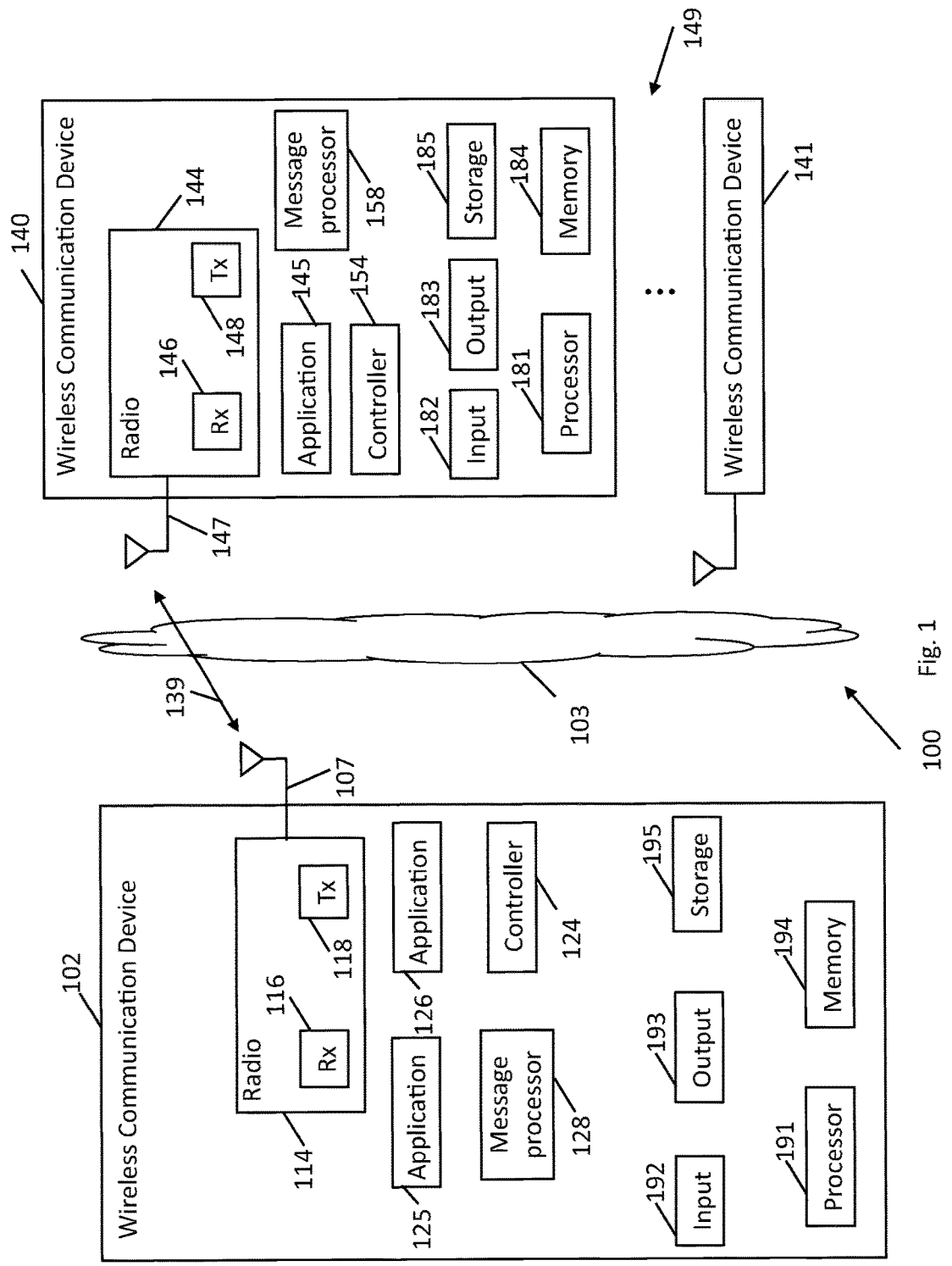
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (WiFi P2P technical specification, version 1.2, 2012) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless IAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless IAN Medium Access Control (MAC) and Physical Layer (PHY) Specifications—Amendment 3: Enhancements for Very High Throughput in the 60 GHz Band", 28 December, 2012); IEEE 802.11Revmc; and/or IEEE 802.11x) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/ or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi Direct P2P communication. However, other embodiments may be implemented with respect to any other Peer to Peer communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices. For example, system 100 may include a wireless communication device 102 configured to communicate with one or more devices of a plurality of wireless communication devices 149, for example, including devices 140 and 141, e.g., as described below.

In some demonstrative embodiments, wireless communication devices 102 and/or 149 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or one or more of devices 149, e.g., device 140 and/or device 141, may include, for example, one or more of a processor 181, an input unit 182, an output unit 183, a memory unit 184, and a storage unit 185. Devices 102 and/or 149 may optionally include other suitable hardware components and/or software components. In some demonstrative embodiments, some or all of the components of one or more of devices 102 and/or 149 may be enclosed in a common housing or packaging, and may be interconnected or operably associated using one or more wired or wireless links. In other embodiments, components of one or more of devices 102 and/or 149 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 149 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, and/or any other frequency band.

In some demonstrative embodiments, devices 102 and/or 149 may include one or more radios including circuitry and/or logic to perform wireless communication between devices 102, 149 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication device 102 and one or more of devices 149 may form a wireless local area network (WLAN).

In some demonstrative embodiments, wireless communication device 102 and one or more of devices 149 may form a WiFi network.

In some demonstrative embodiments, wireless communication devices 102 and/or 149 may form a WiFi Direct (WFD) network, e.g., a WiFi direct services (WFDS) network, and/or may perform the functionality of one or more WFD devices.

In one example, device 102, device 140, and/or device 141 may include, or may perform the functionality of a WiFi Direct device.

In some demonstrative embodiments, wireless communication medium 103 may include a direct link, for example, a PTP link, e.g., a WiFI direct P2P link, for example, to enable direct communication between device 102 and one or more of devices 149, e.g., devices 140 and/or 141.

In some demonstrative embodiments, wireless communication devices 102 and/or 149 may perform the functionality of WFD P2P devices. For example, devices 102, 40 and/or 141 may be able to perform the functionality of a P2P client device, and/or P2P group Owner (GO) device.

In some demonstrative embodiments, wireless communication devices 102 and/or 149 may be capable of forming a WiFi Neighbor Awareness Networking (NAN) network and/or may perform the functionality of one or more NAN devices.

In other embodiments, wireless communication devices 102 and/or 149 may form any other network and/or perform the functionality of any other wireless devices or stations.

In some demonstrative embodiments, devices 102 and/or 149 may include one or more applications configured to provide, share, and/or to use one or more services, e.g., a social application, a file sharing application, a media application and/or the like, for example, using a PTP network, a P2P network, WFD network, a NAN network, or any other network.

In some demonstrative embodiments, device 102 may execute an application 125 and/or an application 126. In some demonstrative embodiments, device 140 may execute an application 145.

In some demonstrative embodiments, devices 102 and/or 149 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102 and/or 149 may include a controller configured to control one or more functionalities of devices 102 and/or 149, for example, one or more functionalities of communication, e.g., PTP communication, NAN communication and/or any other communication, between devices 102 and/or 149 and/or other devices, and/or any other functionality, e.g., as described below. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 149 may perform the functionality of a device, for example, a PTP device, a WFD P2P device, or a NAN device, capable of discovering other devices according to a discovery protocol and/or scheme.

In some demonstrative embodiments, radios 114 and/or 144 may communicate over wireless communication medium 103 according to a discovery scheme, for example, a NAN discovery scheme, or any other discovery scheme, e.g., as described below.

In some demonstrative embodiments, devices 102 and/or 149 may perform a discovery process according to the discovery scheme, for example, to discover each other and/or to establish a wireless communication link, e.g., directional and/or high throughput wireless communication link.

In some demonstrative embodiments, devices 102 and/or 149 may be configured to enable time synchronization between device 102, device 149 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, devices 102 and/or 149 may perform the functionality of NAN devices, e.g., belonging to a NAN cluster, which may share a common set of NAN parameters, for example, including a common time period between consecutive discovery windows (DWs), e.g., as described below.

In some demonstrative embodiments, devices 102 and/or 149 may be configured to discover one another over a predefined communication channel ("the social channel"), e.g., as described below. In one example, the Channel 6 in the 2.4 GHz band may be defined as the NAN social channel. Any other channel may be used as the social channel.

In some demonstrative embodiments, devices 102 and/or 140 may transmit discovery frames during the plurality of DWs, e.g., over the social channel In one example, devices 102 and/or 140 may transmit the discovery frames to discover each other, for example, to enable using the one or more services provided by applications 125, 126 and/or 145.

In some demonstrative embodiments, devices 102 and/or 149 may communicate during a DW according to a contention mechanism. For example, devices 102 and/or 149 may check whether or not a channel is unoccupied prior to an attempt to transmit a discovery frame during the discovery window.

In some demonstrative embodiments, a device of devices 102 and/or 149, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

Some demonstrative embodiments are described with respect to a group-addressed frame addressed to a group of devices. Other embodiments may include any other type of frame, which may be communicated to any other plurality of devices.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102 and/or 149, to advertise its availability, for example, in terms of at least one channel and one or more timeslots, during which the device may be available, e.g., active ("awake), for example, to perform post NAN activities.

In some demonstrative embodiments, the one or more post NAN activities may be defined, for example, to include a P2P operation, a WLAN infrastructure activity, an IBSS attribute activity, a Mesh and Further NAN Service Discovery activity, and/or any other activity or operation.

In some demonstrative embodiments, a robust peer to peer connectivity may be defined as a post NAN activity. The robust peer to peer connectivity may be, for example, conducted based on the availability information advertized during the NAN discover, for example, using the available channels and time slots that a NAN device advertised in the Availability Interval Bitmap and/or Further Availability Map, e.g., as described below.

In some demonstrative embodiments, devices 102 and/or 149 may be configured to enable delivery of traffic from a device, e.g., device 102, to a plurality of devices, e.g., two or more of devices 149, for example, in the form of multicast traffic, group-addressed traffic, multi-user traffic, or any other form of traffic to be received by a plurality of devices.

In some demonstrative embodiments, the ability to communicate multicast traffic, group-addressed traffic, and/or multi-user traffic may improve channel efficiency significantly, for example, particularly, with multicast video streaming, audio streaming, and/or any other traffic.

In some demonstrative embodiments, devices 102 and/or 149 may be configured to utilize a robust group addressed traffic delivery mechanism, for example, a robust multicast traffic delivery mechanism, e.g., as described below.

Some demonstrative embodiments are described herein with reference to a multicast transmission to a multicast group. Other embodiments may include or may be implemented with respect to a multi-user transmission, multi-device transmission, multi-station transmission, group transmission, or any other transmission to a plurality of devices, stations, users and/or destinations.

Some demonstrative embodiments may be implemented, for example, to allow a PTP device, e.g., device 102, to deliver multicast traffic to a multicast group, for example, including two or more of devices 149, e.g., even without establishing a P2P group with devices 149.

In some demonstrative embodiments, the multi-user communication scheme, e.g., as described below, may be implemented together with, or in combination with, a robust peer to peer connectivity scheme, e.g., to provide an integrated and/or complete solution for robust peer to peer networking, e.g., as described below.

In some demonstrative embodiments, device 102 may communicate with devices 149 one or more messages 139, for example, discovery messages, e.g., WLAN discovery messages, WiFi Service discovery messages, NAN service discovery messages, and/or any other type of messages.

In some demonstrative embodiments, device 102 may use the discovery messages to indicate one or more settings, parameters, and/or attributes corresponding to multicast traffic to be communicated between device 102 and devices 149, e.g., as described below.

In some demonstrative embodiments, controller 124 may define a multi-user attribute, for example, a "Multicast Attribute", to include, for example, an address field, for example, a group destination address, e.g., a Multicast group destination address, a source address, e.g., a Multicast source address, and availability information, e.g., in the form of an Availability Interval Bitmap and/or a Further Availability Map, and/or any other Information Element (IE) and/or field, e.g., as described below.

In some demonstrative embodiments, radio 114 may transmit the multi-user attribute in one or more of messages 139.

In some demonstrative embodiments, radio 114 may transmit the multi-user attribute in a NAN Service Discovery frame, for example, to indicate where, e.g., using one or more channels ("advertized channels"), and when, e.g., using one or more time slots ("advertized time slots"), multi-user traffic is to be delivered by device 102 to the plurality of devices.

In some demonstrative embodiments, controller 124 may generate a Peer to Peer discovery frame including at least one multi-user attribute, e.g., a Multicast attribute, which may include an address field and one or more attribute fields, e.g., as described below.

In some demonstrative embodiments, the address field may include a destination address field configured to indicate a plurality of devices, for example, to which multi-user traffic, e.g., multicast traffic, is to be transmitted, e.g., as described below.

In some demonstrative embodiments, controller 124 may determine the fields of the multi-user attribute, and controller 124 may cause message processor 128 to generate the Peer to Peer discovery frame including the multi-user attribute.

In one example, controller 124 may determine the fields of the Multicast attribute, and controller 124 may cause message processor 128 to generate a NAN Service discovery frame including the Multicast attribute, e.g., as described below.

In some demonstrative embodiments, the destination address field may include a Multicast group destination address field, e.g., to include an address assigned to a multicast group.

In other embodiments, the destination address field may include any other one or more address values and/or fields to indicate the plurality of users to receive a multi-device transmission from device 102.

In some demonstrative embodiments, the discovery frame may include a NAN Service discovery frame, and the destination address field may include, for example, a NAN cluster address, for example, of a NAN cluster including device 102, and devices 149, e.g., as described below.

For example, devices 102, 140 and 141 may be configured to communicate as part of a NAN cluster, e.g., during NAN discovery. According to this example, the destination address field of the multi-user attribute may include a NAN cluster address of the NAN cluster. According to this example, the multi-group traffic may include traffic to be delivered to all devices of the NAN cluster.

In other embodiments, the destination address field may include any one or more other type of values, fields and/or addresses. For example, the destination address field may include a dedicated group address, which may be assigned to a group of users, e.g., which may include only some of the devices of the NAN cluster, all devices of the NAN cluster, or even devices of more than one NAN cluster.

In one example, the destination address field may include a dedicated multicast address, which may be assigned to a multicast group, e.g., which may include only some of the devices of the NAN cluster, all devices of the NAN cluster, or even devices of more than one NAN cluster. The dedicated multicast address may be assigned, for example, based on communications between applications 125, 126, 145 and/or by a service provider.

In some demonstrative embodiments, the multi-user attribute may also include a source address, e.g., a Multicast source address, to indicate an address to deliver multi-device traffic, e.g., multicast traffic, to the plurality of devices, e.g., as described below.

In some demonstrative embodiments, the source address may include a Media Access Control (MAC) address of radio 144, or any other address or identifier.

In some demonstrative embodiments, radio 114 may transmit the multi-user traffic, e.g., the multicast traffic, to the plurality of devices according to the one or more attribute fields of the multi-user attribute, e.g., the Multicast attribute, as described below.

In some demonstrative embodiments, controller 124 may cause radio 114 to transmit the Peer to Peer discovery frame over a social channel, e.g., the NAN social channel, and to transmit the multi-user traffic over another channel different from the social channel, for example, over at least one advertized channel and during one or more advertized time slots, which may be advertized by the discovery frame, e.g., as described below.

In some demonstrative embodiments, device 102 may be configured to begin transmitting of the multicast traffic, for example, at the beginning of advertized time slots, e.g., on the advertized channels.

In some demonstrative embodiments, device 102 may be configured to complete the delivery of the multicast traffic, for example, at the completion of multicast traffic delivery, e.g., buffered by device 102.

In some demonstrative embodiments, the plurality of devices, e.g., devices 140 and/or 141, may be configured to determine the advertized channels and advertized time slots, e.g., based on the multi-user attribute received from device 102, and to arrive at the advertised channels and timeslot to receive the multi-user traffic.

For example, devices who belong to the multicast group, e.g., devices 140 and/or 141, may be configured to determine the advertized channels and advertized time slots, e.g., based on the Multicast attribute received from device 102, and to arrive at the advertised channels and timeslots to receive the multicast traffic.

In some demonstrative embodiments, radio 144 may receive the Peer to Peer discovery frame from device 102.

In some demonstrative embodiments, controller 154 may process the Peer to Peer discovery frame, and may cause radio 144 to receive the multiuser traffic, e.g., the multicast traffic, from device 102 according to the one or more attribute fields of the discovery frame, e.g., as described below.

For example, message processor 158 may process the peer to peer discovery frame to determine the fields of the Multicast attribute, and controller 154 may control radio 144 according to the attribute fields of the Multicast attribute.

In some demonstrative embodiments, controller 124 may generate the discovery frame to include the one or more attribute fields including availability information to indicate at least one channel and one or more time slots, e.g., to be used to communicate the multi-user traffic, e.g., the multicast traffic.

In some demonstrative embodiments, controller 124 may cause radio 114 to transmit the multi-user traffic, e.g., the multicast traffic, to the plurality of devices over the at least one channel during the one or more time slots.

In some demonstrative embodiments, device 102 may use the discovery frame to define a plurality of channels and/or a plurality of time slots to communicate the multicast traffic with devices 149, e.g., as described below.

In some demonstrative embodiments, controller 124 may configure the availability information to indicate a first channel, a first time slot corresponding to the first channel, a second channel, e.g., different from the first channel, and a second time slot, e.g., different from the first time slot, corresponding to the second channel. The first and second channels and/or the first and second time slots may include, for example, channels and time slots in which device 102 may be active and/or available for communication. For example, device 102 may be available to communicate in the first channel during the first time slot, and in the second channel during the second time slot.

In some demonstrative embodiments, controller 124 may cause radio 114 to transmit first multi-user traffic, e.g., first multicast traffic, over the first channel during the first time slot, and controller 124 may cause radio 114 to switch to the second channel to transmit second multi-user traffic, e.g., second multicast traffic, during the second time slot.

In some demonstrative embodiments, device 102 may use the information in the discovery frame to inform devices 149 of the channels and/or time slots, during which the multi-user traffic is to be communicated. The ability to advertize the plurality of channels to be used during the plurality of time slots may enable device 102 to better utilize wireless medium 103, e.g., in accordance with an availability of device 102.

In some demonstrative embodiments, controller 124 may configure the availability information as part of a Map control field, and/or an Availability intervals bitmap field, e.g., as described below.

In some demonstrative embodiments, controller 154 may utilize the availability information received from device 102, for example, to cause radio 144 to receive the multicast traffic from device 102 over the at least one channel during the one or more time slots, e.g., according to the availability information.

In some demonstrative embodiments, devices 102 and/or 149 may implement a protection mechanism to protect and/or secure the multi-user traffic.

In some demonstrative embodiments, devices 102 and/or 140 may protect the multi-user traffic, for example, by a group key. For example, controller 124 may protect the multicast traffic to be transmitted from device 102 according to the group key, and controller 154 may process the multicast traffic from device 102 using the group key, e.g., as described below.

In some demonstrative embodiments, generation of the group key and distribution may be completed, for example, in an application layer, e.g., when and where devices 102, and/or 149, or applications 125, 126 and/or 145 register for the multicast group.

In some demonstrative embodiments, the Multicast traffic may be protected by layer-2 encryption, for example, using a Group Temporal Key (GTK), e.g., as defined in the IEEE 802.11 Standards, or any other key.

In some demonstrative embodiments, controllers 124 and 154 may be configured to communicate between devices 102 and 140 one or more messages to configured to setup and/or determine the GTK, for example, over the at least one advertized channel and/or during the one or more advertized time slots indicated by the availability information. For example, controllers 124 and 154 may exchange messages of a 4-way handshake to determine the GTK.

In other embodiments, any other suitable protection mechanism may be implemented to protect and/or secure the multi-user traffic.

In some demonstrative embodiments, communicating the multi-user attribute, e.g., the Multicast attribute, between device 102 and devices 149 may enable device 102 to deliver multi-user traffic, e.g., multicast traffic, to a plurality of devices, e.g., a multicast group, for example, including devices 140 and/or 141, e.g., even without establishing a P2P group between a P2P group owner and P2P clients.

Accordingly, some demonstrative embodiments may enable a PTP device, for example, device 102, e.g., even if not acting as a P2P group owner and/or without needing to setup a P2P group, to deliver multi-user traffic, e.g., multicast traffic, to a plurality of devices, for example, to a multicast group.

In some demonstrative embodiments, controller 124 may control radio 114 to transmit the multicast traffic to devices 149, for example, even without establishing a Peer to Peer group with devices 149.

In some demonstrative embodiments, controller 124 may control radio 114 to transmit the multicast traffic to device 149, for example, even if device 102 is not a Peer to Peer Group Owner (GO).

In some demonstrative embodiments, the Multicast Attribute may include one or more fields or information elements (IEs) to include information corresponding to a multicast scheme.

In one example, the Multicast Attribute may include, for example, one or more fields of the following attribute:

TABLE 1

| Field | Size (octets) | Value | Description |
|---|---|---|---|
| Attribute ID | 1 | 0x06 | Identifies the type of NAN attribute. |
| Length | 2 | Variable | Length of the following fields in the attribute. |
| Multicast | 6 | Variable | Indicates MAC address that will deliver the |

TABLE 1-continued

| Field | Size (octets) | Value | Description |
|---|---|---|---|
| Source Address | | | Multicast traffic for the multicast group. |
| Multicast group destination address | 6 | Variable | Indicates the multicast group destination address. |
| Map Control | 1 | Variable | The availability channel and time map control information. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |

In some demonstrative embodiments, the Multicast Attribute of Table 1 may be, for example, included in a discovery frame, for example, a NAN Service Discovery frame, or any other frame, and transmitted, for example, in the NAN Discovery Window, or during any other time period.

In some demonstrative embodiments, the Multicast Attribute may include any other additional or alternative fields and/or IEs.

In some demonstrative embodiments, device 102 may transmit, for example, a discovery message, for example, a NAN Service discovery message, including the Multicast Attribute of Table 1, for example, to configure a multicast scheme for delivering multicast traffic to a plurality of devices, e.g., including devices 140 and/or 141, e.g., as described above.

Figure 2:
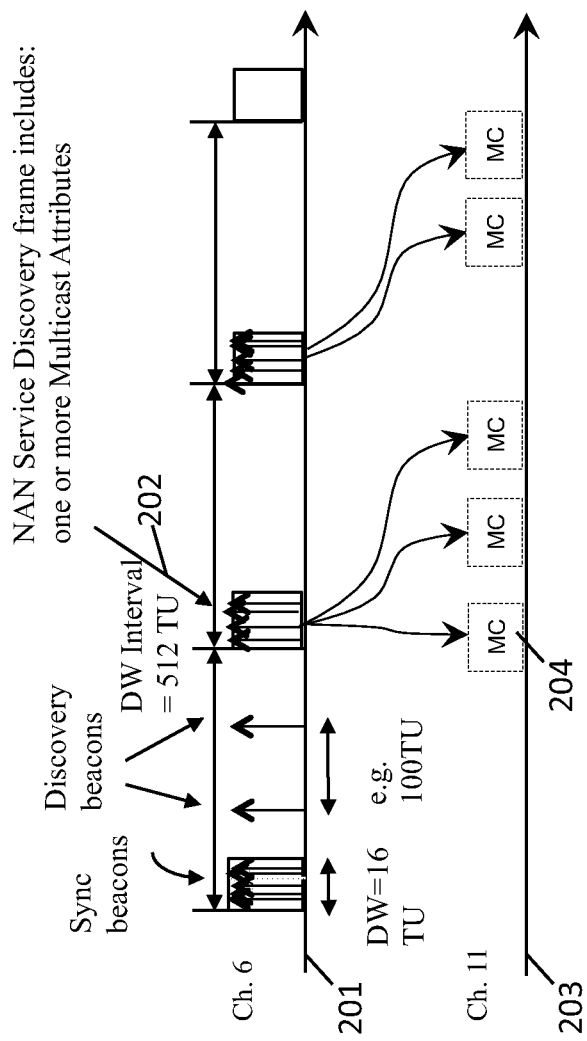
FIG. 2 is a sequence diagram of communications according to a multicast communication scheme, in accordance with some demonstrative embodiments.

Reference is made to FIG. 2, which schematically illustrates a sequence diagram of communications of a multicast communication, in accordance with some demonstrative embodiments. For example, one or more of the communications of FIG. 2 may be performed, for example, by device 102 (FIG. 1) and/or one or more of devices 149 (FIG. 1).

As shown in FIG. 2, one or more devices, e.g., device 102 (FIG. 1) and/or devices 149 (FIG. 1), may communicate over a first channel 201, for example a social channel 201, e.g., the NAN social Channel 6 of the 2.4 GHz frequency band, for example, according to a discovery scheme, e.g., as described above. In one example, the discovery scheme may include a NAN discovery scheme, e.g., as described above.

As shown in FIG. 2, a device ("source device"), e.g., device 102 (FIG. 1), may transmit a NAN Service discovery frame 202 including one or more Multicast Attributes, e.g., to configure a multicast transmission to a plurality of devices ("destination devices"), e.g., including devices 140 and/or 141 (FIG. 1).

As shown in FIG. 2, the destination devices may determine at least one second channel 203, e.g., channel 11 of the 2.4 GHz frequency band, and a time slot during which the multicast traffic is to be delivered ("the advertized channel" and "the advertized time slots"), e.g., according to the availability information advertized by the Multicast Attribute.

As shown in FIG. 2, the source device may transmit to the destination devices multicast traffic 204, and the destination devices may wait to receive the multicast traffic 204 over the advertized channel and during the advertized time slots.

Figure 3:
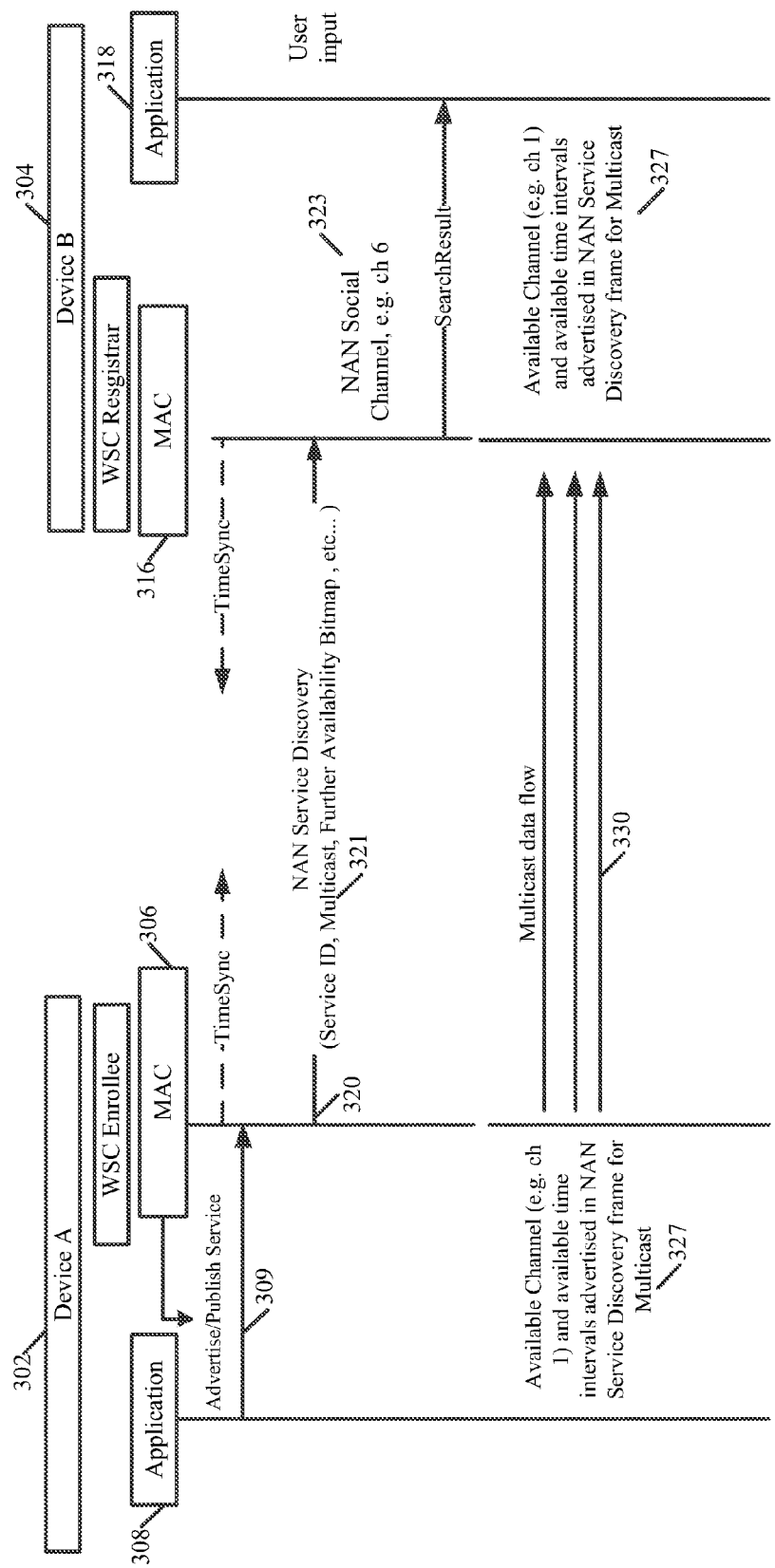
FIG. 3 is a sequence diagram of operations between a first wireless communication device and a second wireless communication device, in accordance with some demonstrative embodiments.

Reference is made to FIG. 3, which schematically illustrates a sequence diagram, which demonstrates operations and interactions between a first wireless communication device (Device A) 302 and a second wireless communication device (Device B) 304, in accordance with some demonstrative embodiments. For example, device 302 may perform the functionality of device 102 (FIG. 1) and/or device 304 may perform the functionality of device 140 (FIG. 1).

As shown in FIG. 3, device 302 may include a MAC 306 to control communication by device 302 over a wireless medium, and device 304 may include a MAC 316 to control communication by device 304 over the wireless medium. For example, MAC 306 may perform the functionality of controller 124 (FIG. 1), and/or MAC 316 may perform the functionality of controller 154 (FIG. 1).

As shown in FIG. 3, device 302 may execute an application 308, and/or device 304 may execute an application 318. For example, application 308 may perform the functionality of application 125 (FIG. 1), and/or application 318 may perform the functionality of application 145 (FIG. 1).

As shown in FIG. 3, application 308 may advertise and/or publish (309) a service.

As shown in FIG. 3, device 302 may transmit a NAN service discovery frame 320, for example, over the NAN social channel, e.g., channel 6 of the 2.4 GHz frequency band.

In some demonstrative embodiments, NAN service discovery frame 320 may include a Multicast attribute 321 to define a multicast scheme to communicate traffic from device 302 to a plurality of devices including device 304, e.g., subsequent to the NAN discovery.

In some demonstrative embodiments, the Multicast attribute 321 may include, for example, availability information ("Multicast availability information") to define one or more channels 327 and one or more time slots during which device 302 is to transmit multicast traffic. For example, the Multicast attribute 321 may include one or more fields of the Multicast attribute described above with reference to Table 1.

In some demonstrative embodiments, device 302 may transmit multicast traffic 320 over the one or more channels 327 during the one or more time slots advertized by the Multicast attribute 321.

In some demonstrative embodiments, device 304 may wait to receive the multicast traffic 330 on the one or more channels 327 during the one or more time slots advertized by the Multicast attribute 321.

Figure 4:
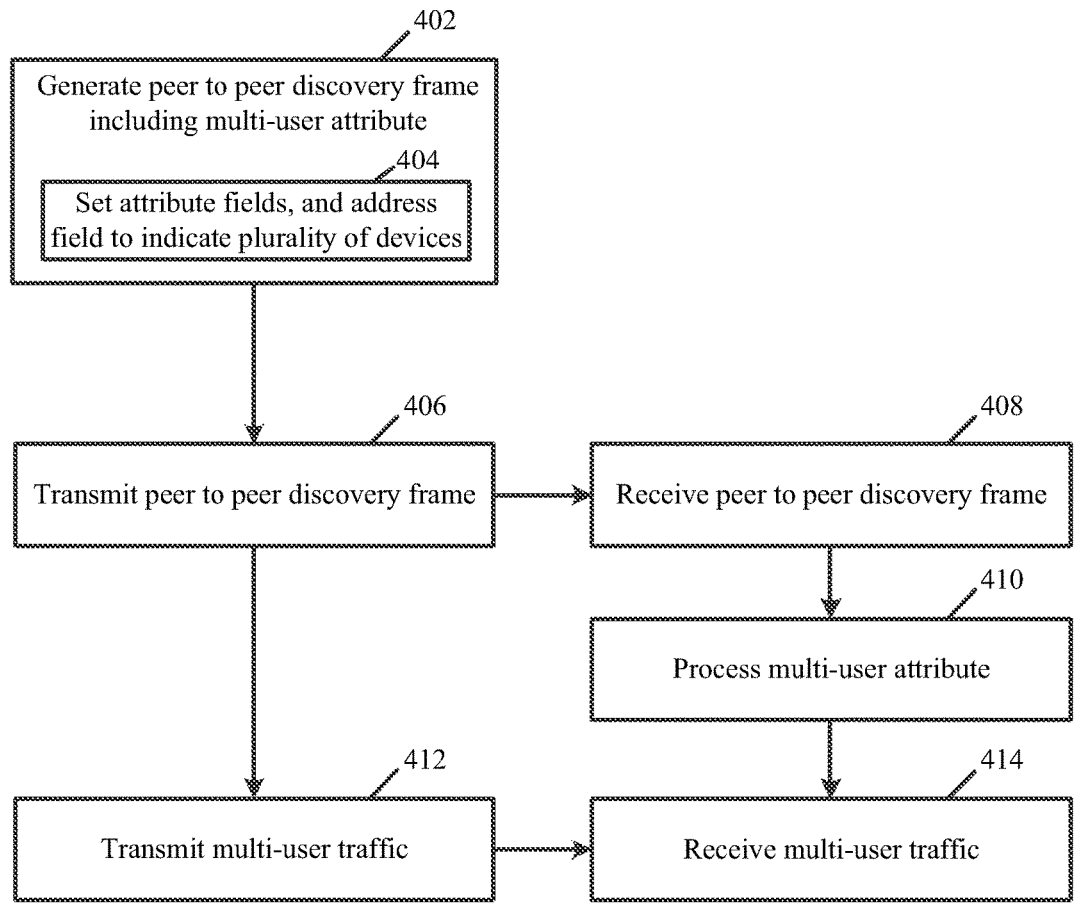
FIG. 4 is a schematic flow-chart illustration of a method of peer to peer communication, in accordance with some demonstrative embodiments.

Reference is made to FIG. 4, which schematically illustrates a method of peer to peer communication, in accordance with some demonstrative embodiments. On or more operations of the method of FIG. 4 may be performed, for example, by one or more elements of a system, e.g., system 100 (FIG. 1), a device, e.g., device 102 (FIG. 1), device 140 (FIG. 1), device 141 (FIG. 1), device 302 (FIG. 3), and/or device 304 (FIG. 3), a controller, e.g., controller 124 (FIG. 1), and/or controller 154 (FIG. 1), a radio, e.g., radio 114 (FIG. 1), and/or radio 144 (FIG. 1), and/or a message processor, e.g., message processor 128 (FIG. 1), and/or message processor 158 (FIG. 1).

As indicated at block 402, the method may include generating a Peer to Peer discovery frame including at least one multi-user attribute, e.g., a Multicast attribute. For example, message processor 128 (FIG. 1) and/or controller 124 (FIG. 1) may generate a discovery frame, e.g., a NAN Service discovery frame, including the Multicast attribute, e.g., as described above.

As indicate at block 404, the method may include setting the multi-user Attribute to include an address field and one or more attribute fields, the address field to indicate a plurality of devices. For example, message processor 128 (FIG. 1) and/or controller 124 (FIG. 1) may set the Multicast attribute to include the multicast address field, and one or more fields including the availability information, e.g., as described above.

As indicated at block 406, the method may include transmitting the Peer to Peer discovery frame. For example, controller 124 (FIG. 1) may cause radio 114 (FIG. 1) to transmit the discovery frame, for example, over a NAN social channel, e.g., as described above.

As indicated at block 408, the method may include receiving the Peer to peer discovery frame including the multi-user attribute, e.g., the Multicast attribute. For example, radio 144 (FIG. 1) may receive the Peer to peer discovery frame from device 102 (FIG. 1), for example, over the NAN social channel, e.g., as described above.

As indicated at block 410, the method may include processing the multi-user attribute, e.g., the Multicast attribute. For example, message processor 158 (FIG. 1) and/or controller 154 (FIG. 1) may process the Multicast attribute, for example, to determine the one or more advertized channels and/or one or more advertized time slots, e.g., as described above.

As indicated at block 412, the method may include transmitting multi-user traffic, e.g., multicast traffic, to the plurality of devices according to the one or more attribute fields. For example, controller 124 (FIG. 1) may cause radio 114 (FIG. 1) to transmit the multicast traffic, for example, according to the availability information advertized by the Multicast attribute, e.g., as described above.

As indicated at block 414, the method may include receiving the multicast traffic according to the one or more attribute fields. For example, controller 154 (FIG. 1) may control radio 144 (FIG. 1) to receive the multicast traffic from device 102 (FIG. 1), for example, over the one or more advertized channels and during the one or more advertized time slots, e.g., as described above.

Figure 5:
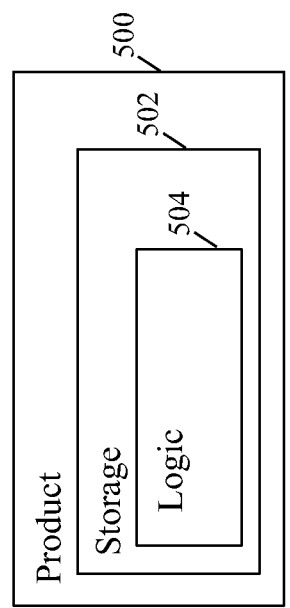
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of devices 102 (FIG. 1), 140 (FIG. 1), 141 (FIG. 1), 149 (FIG. 1), 302 (FIG. 3), 304 (FIG. 3), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), to perform one or more operations of the sequence of FIGS. 2 and/or 3, and/or to perform one or more of the operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless device comprising a controller to generate a Peer to Peer discovery frame including at least one Multicast attribute, the Multicast Attribute including an address field and one or more attribute fields, the address field to indicate a plurality of devices; and a radio to transmit the Peer to Peer discovery frame, and to transmit multicast traffic to the plurality of devices according to the one or more attribute fields.

Example 2 includes the subject matter of Example 1, and optionally, wherein the one or more attribute fields include availability information to indicate at least one channel and one or more time slots, the radio to transmit the multicast traffic to the plurality of devices over the at least one channel during the one or more time slots.

Example 3 includes the subject matter of Example 2, and optionally, wherein the availability information is to indicate a first channel, a first time slot corresponding to the first channel, a second channel, and a second time slot corresponding to the second channel, the controller to cause the radio to transmit first multicast traffic over the first channel during the first time slot, and second multicast traffic over the second channel during the second time slot.

Example 4 includes the subject matter of any one of Examples 1-3, and optionally, wherein the one or more attribute fields include a Map control field, and an Availability intervals bitmap field.

Example 5 includes the subject matter of any one of Examples 1-4, and optionally, wherein the address field includes a Multicast group destination address field.

Example 6 includes the subject matter of any one of Examples 1-5, and optionally, wherein the Multicast attribute includes a Multicast source address to indicate an address to deliver multicast traffic to the plurality of devices.

Example 7 includes the subject matter of Example 6, and optionally, wherein the Multicast source address includes a Media Access Control (MAC) address of the radio.

Example 8 includes the subject matter of any one of Examples 1-7, and optionally, wherein the controller is to protect the multicast traffic with a group key.

Example 9 includes the subject matter of Example 8, and optionally, wherein the group key comprises a Group Temporal Key (GTK), the one or more attribute fields include availability information to indicate at least one channel and one or more time slots, the controller to determine the GTK based on messages communicated with the plurality of devices over the at least one channel during the one or more time slots.

Example 10 includes the subject matter of any one of Examples 1-9, and optionally, wherein the radio is to transmit the Peer to Peer discovery frame over a social channel, and to transmit the multicast traffic over another channel different from the social channel.

Example 11 includes the subject matter of any one of Examples 1-10, and optionally, wherein the controller is to control the radio to transmit the multicast traffic without establishing a Peer to Peer group with the plurality of devices.

Example 12 includes the subject matter of any one of Examples 1-11, and optionally, wherein the controller is to control the radio to transmit the multicast traffic, even when the wireless device is not a Peer to Peer Group Owner (GO).

Example 13 includes the subject matter of any one of Examples 1-12, and optionally, wherein the discovery frame comprises a Neighbor Awareness Network (NAN) Service Discovery frame.

Example 14 includes the subject matter of Example 13, and optionally, wherein the address field comprises a NAN cluster address.

Example 15 includes the subject matter of any one of Examples 1-14, and optionally, the wireless device being a Wireless Fidelity (Wi-Fi) direct device.

Example 16 includes the subject matter of any one of Examples 1-15, and optionally, including one or more antennas, a processor, and a memory.

Example 17 includes a first wireless device comprising a radio to receive a Peer to Peer discovery frame from a second wireless device, the Peer to peer discovery frame including at least one Multicast attribute, the Multicast Attribute including an address field to indicate a plurality of devices and one or more attribute fields, the plurality of devices including the first wireless device; and a controller to process the Peer to Peer discovery frame and to cause the radio to receive multicast traffic from the second wireless device according to the one or more attribute fields.

Example 18 includes the subject matter of Example 17, and optionally, wherein the one or more attribute fields include availability information to indicate at least one channel and one or more time slots, the controller to cause the radio to receive the multicast traffic from the second wireless device over the at least one channel during the one or more time slots.

Example 19 includes the subject matter of Example 18, and optionally, wherein the availability information is to indicate a first channel, a first time slot corresponding to the first channel, a second channel, and a second time slot corresponding to the second channel, the controller to cause the radio to receive first multicast traffic over the first channel during the first time slot, and second multicast traffic over the second channel during the second time slot.

Example 20 includes the subject matter of any one of Examples 17-19, and optionally, wherein the one or more attribute fields include a Map control field, and an Availability intervals bitmap field.

Example 21 includes the subject matter of any one of Examples 17-20, and optionally, wherein the address field includes a Multicast group destination address field.

Example 22 includes the subject matter of any one of Examples 17-21, and optionally, wherein the Multicast attribute includes a Multicast source address to indicate an address to deliver multicast traffic to the plurality of devices.

Example 23 includes the subject matter of Example 22, and optionally, wherein the Multicast source address includes a Media Access Control (MAC) address of the second wireless device.

Example 24 includes the subject matter of any one of Examples 17-23, and optionally, wherein the multicast traffic is protected with a group key, the controller to process the multicast traffic using the group key.

Example 25 includes the subject matter of Example 24, and optionally, wherein the group key comprises a Group Temporal Key (GTK), the one or more attribute fields include availability information to indicate at least one channel and one or more time slots, the controller to determine the GTK based on messages communicated with the second wireless device over the at least one channel during the one or more time slots.

Example 26 includes the subject matter of any one of Examples 17-25, and optionally, wherein the radio is to receive the Peer to Peer discovery frame over a social channel, and to receive the multicast transmission over another channel different from the social channel Example 27 includes the subject matter of any one of Examples 17-26, and optionally, wherein the controller is to control the radio to receive the multicast transmission without establishing a Peer to Peer group with the second device.

Example 28 includes the subject matter of any one of Examples 17-27, and optionally, wherein the controller is to control the radio to receive the multicast transmission, even when the first wireless device is not a Peer to Peer client in a Peer to Peer group.

Example 29 includes the subject matter of any one of Examples 17-28, and optionally, wherein the discovery frame comprises a Neighbor Awareness Network (NAN) Service Discovery frame.

Example 30 includes the subject matter of Example 29, and optionally, wherein the address field comprises a NAN cluster address.

Example 31 includes the subject matter of any one of Examples 17-30, and optionally, the first wireless device being a Wireless Fidelity (Wi-Fi) direct device.

Example 32 includes the subject matter of any one of Examples 17-31, and optionally, including one or more antennas, a processor, and a memory.

Example 33 includes a system of wireless communication including a wireless device, the wireless device comprising one or more antennas; a memory; a processor; a controller to generate a Peer to Peer discovery frame including at least one Multicast attribute, the Multicast Attribute including an address field and one or more attribute fields, the address field to indicate a plurality of devices; and a radio to transmit the Peer to Peer discovery frame, and to transmit multicast traffic to the plurality of devices according to the one or more attribute fields.

Example 34 includes the subject matter of Example 33, and optionally, wherein the one or more attribute fields include availability information to indicate at least one channel and one or more time slots, the radio to transmit the multicast traffic to the plurality of devices over the at least one channel during the one or more time slots.

Example 35 includes the subject matter of Example 34, and optionally, wherein the availability information is to indicate a first channel, a first time slot corresponding to the first channel, a second channel, and a second time slot corresponding to the second channel, the controller to cause the radio to transmit first multicast traffic over the first channel during the first time slot, and second multicast traffic over the second channel during the second time slot.

Example 36 includes the subject matter of any one of Examples 33-35, and optionally, wherein the one or more attribute fields include a Map control field, and an Availability intervals bitmap field.

Example 37 includes the subject matter of any one of Examples 33-36, and optionally, wherein the address field includes a Multicast group destination address field.

Example 38 includes the subject matter of any one of Examples 33-37, and optionally, wherein the Multicast attribute includes a Multicast source address to indicate an address to deliver multicast traffic to the plurality of devices.

Example 39 includes the subject matter of Example 38, and optionally, wherein the Multicast source address includes a Media Access Control (MAC) address of the radio.

Example 40 includes the subject matter of any one of Examples 33-39, and optionally, wherein the controller is to protect the multicast traffic with a group key.

Example 41 includes the subject matter of Example 40, and optionally, wherein the group key comprises a Group Temporal Key (GTK), the one or more attribute fields include availability information to indicate at least one channel and one or more time slots, the controller to determine the GTK based on messages communicated with the plurality of devices over the at least one channel during the one or more time slots.

Example 42 includes the subject matter of any one of Examples 33-41, and optionally, wherein the radio is to transmit the Peer to Peer discovery frame over a social channel, and to transmit the multicast traffic over another channel different from the social channel.

Example 43 includes the subject matter of any one of Examples 33-42, and optionally, wherein the controller is to control the radio to transmit the multicast traffic without establishing a Peer to Peer group with the plurality of devices.

Example 44 includes the subject matter of any one of Examples 33-43, and optionally, wherein the controller is to control the radio to transmit the multicast traffic, even when the wireless device is not a Peer to Peer Group Owner (GO).

Example 45 includes the subject matter of any one of Examples 33-44, and optionally, wherein the discovery frame comprises a Neighbor Awareness Network (NAN) Service Discovery frame.

Example 46 includes the subject matter of Example 45, and optionally, wherein the address field comprises a NAN cluster address.

Example 47 includes the subject matter of any one of Examples 33-46, and optionally, wherein the wireless device includes a Wireless Fidelity (Wi-Fi) direct device.

Example 48 includes a system of wireless communication including first wireless device, the first device comprising one or more antennas; a memory; a processor; a radio to receive a Peer to Peer discovery frame from a second wireless device, the Peer to peer discovery frame including at least one Multicast attribute, the Multicast Attribute including an address field to indicate a plurality of devices and one or more attribute fields, the plurality of devices including the first wireless device; and a controller to process the Peer to Peer discovery frame and to cause the radio to receive multicast traffic from the second wireless device according to the one or more attribute fields.

Example 49 includes the subject matter of Example 48, and optionally, wherein the one or more attribute fields include availability information to indicate at least one channel and one or more time slots, the controller to cause the radio to receive the multicast traffic from the second wireless device over the at least one channel during the one or more time slots.

Example 50 includes the subject matter of Example 49, and optionally, wherein the availability information is to indicate a first channel, a first time slot corresponding to the first channel, a second channel, and a second time slot corresponding to the second channel, the controller to cause the radio to receive first multicast traffic over the first channel during the first time slot, and second multicast traffic over the second channel during the second time slot.

Example 51 includes the subject matter of any one of Examples 48-50, and optionally, wherein the one or more attribute fields include a Map control field, and an Availability intervals bitmap field.

Example 52 includes the subject matter of any one of Examples 48-51, and optionally, wherein the address field includes a Multicast group destination address field.

Example 53 includes the subject matter of any one of Examples 48-52, and optionally, wherein the Multicast attribute includes a Multicast source address to indicate an address to deliver multicast traffic to the plurality of devices.

Example 54 includes the subject matter of Example 53, and optionally, wherein the Multicast source address includes a Media Access Control (MAC) address of the second wireless device.

Example 55 includes the subject matter of any one of Examples 48-54, and optionally, wherein the multicast traffic is protected with a group key, the controller to process the multicast traffic using the group key.

Example 56 includes the subject matter of Example 55, and optionally, wherein the group key comprises a Group Temporal Key (GTK), the one or more attribute fields include availability information to indicate at least one channel and one or more time slots, the controller to determine the GTK based on messages communicated with the second wireless device over the at least one channel during the one or more time slots.

Example 57 includes the subject matter of any one of Examples 48-56, and optionally, wherein the radio is to receive the Peer to Peer discovery frame over a social channel, and to receive the multicast transmission over another channel different from the social channel.

Example 58 includes the subject matter of any one of Examples 48-57, and optionally, wherein the controller is to control the radio to receive the multicast transmission without establishing a Peer to Peer group with the second device.

Example 59 includes the subject matter of any one of Examples 48-58, and optionally, wherein the controller is to control the radio to receive the multicast transmission, even when the first wireless device is not a Peer to Peer client in a Peer to Peer group.

Example 60 includes the subject matter of any one of Examples 48-59, and optionally, wherein the discovery frame comprises a Neighbor Awareness Network (NAN) Service Discovery frame.

Example 61 includes the subject matter of Example 60, and optionally, wherein the address field comprises a NAN cluster address.

Example 62 includes the subject matter of any one of Examples 48-60, and optionally, wherein the first wireless device is a Wireless Fidelity (Wi-Fi) direct device.

Example 63 includes the subject matter of any one of Examples 48-62 including one or more antennas, a processor, and a memory.

Example 64 includes a method to be performed at a wireless device, the method comprising generating a Peer to Peer discovery frame including at least one Multicast attribute, the Multicast Attribute including an address field and one or more attribute fields, the address field to indicate a plurality of devices; transmitting the Peer to Peer discovery frame; and transmitting multicast traffic to the plurality of devices according to the one or more attribute fields.

Example 65 includes the subject matter of Example 64, and optionally, wherein the one or more attribute fields include availability information to indicate at least one channel and one or more time slots, the method comprising transmitting the multicast traffic to the plurality of devices over the at least one channel during the one or more time slots.

Example 66 includes the subject matter of Example 65, and optionally, wherein the availability information is to indicate a first channel, a first time slot corresponding to the first channel, a second channel, and a second time slot corresponding to the second channel, the method comprising transmitting first multicast traffic over the first channel during the first time slot, and second multicast traffic over the second channel during the second time slot.

Example 67 includes the subject matter of any one of Examples 64-66, and optionally, wherein the one or more attribute fields include a Map control field, and an Availability intervals bitmap field.

Example 68 includes the subject matter of any one of Examples 64-67, and optionally, wherein the address field includes a Multicast group destination address field.

Example 69 includes the subject matter of any one of Examples 64-68, and optionally, wherein the Multicast attribute includes a Multicast source address to indicate an address to deliver multicast traffic to the plurality of devices.

Example 70 includes the subject matter of Example 69, and optionally, wherein the Multicast source address includes a Media Access Control (MAC) address of the radio.

Example 71 includes the subject matter of any one of Examples 64-70, and optionally, comprising protecting the multicast traffic with a group key.

Example 72 includes the subject matter of Example 71, and optionally, wherein the group key comprises a Group Temporal Key (GTK), the one or more attribute fields include availability information to indicate at least one channel and one or more time slots, the method comprising determining the GTK based on messages communicated with the plurality of devices over the at least one channel during the one or more time slots.

Example 73 includes the subject matter of any one of Examples 64-72, and optionally, comprising transmitting the Peer to Peer discovery frame over a social channel, and transmitting the multicast traffic over another channel different from the social channel Example 74 includes the subject matter of any one of Examples 64-73, and optionally, comprising transmitting the multicast traffic without establishing a Peer to Peer group with the plurality of devices.

Example 75 includes the subject matter of any one of Examples 64-74, and optionally, comprising transmitting the multicast traffic, even when the wireless device is not a Peer to Peer Group Owner (GO).

Example 76 includes the subject matter of any one of Examples 64-75, and optionally, wherein the discovery frame comprises a Neighbor Awareness Network (NAN) Service Discovery frame.

Example 77 includes the subject matter of Example 76, and optionally, wherein the address field comprises a NAN cluster address.

Example 78 includes a method to be performed at a first wireless device, the method comprising receiving a Peer to Peer discovery frame from a second wireless device, the Peer to peer discovery frame including at least one Multicast attribute, the Multicast Attribute including an address field to indicate a plurality of devices and one or more attribute fields, the plurality of devices including the first wireless device; and receiving multicast traffic from the second wireless device according to the one or more attribute fields.

Example 79 includes the subject matter of Example 78, and optionally, wherein the one or more attribute fields include availability information to indicate at least one channel and one or more time slots, the method comprising receiving the multicast traffic from the second wireless device over the at least one channel during the one or more time slots.

Example 80 includes the subject matter of Example 79, and optionally, wherein the availability information is to indicate a first channel, a first time slot corresponding to the first channel, a second channel, and a second time slot corresponding to the second channel, the method comprising receiving first multicast traffic over the first channel during the first time slot, and second multicast traffic over the second channel during the second time slot.

Example 81 includes the subject matter of any one of Examples 78-80, and optionally, wherein the one or more attribute fields include a Map control field, and an Availability intervals bitmap field.

Example 82 includes the subject matter of any one of Examples 78-81, and optionally, wherein the address field includes a Multicast group destination address field.

Example 83 includes the subject matter of any one of Examples 78-82, and optionally, wherein the Multicast attribute includes a Multicast source address to indicate an address to deliver multicast traffic to the plurality of devices.

Example 84 includes the subject matter of Example 83, and optionally, wherein the Multicast source address includes a Media Access Control (MAC) address of the second wireless device.

Example 85 includes the subject matter of any one of Examples 78-84, and optionally, wherein the multicast traffic is protected with a group key, the method comprising processing the multicast traffic using the group key.

Example 86 includes the subject matter of Example 85, and optionally, wherein the group key comprises a Group Temporal Key (GTK), the one or more attribute fields include availability information to indicate at least one channel and one or more time slots, the method comprising determining the GTK based on messages communicated with the second wireless device over the at least one channel during the one or more time slots.

Example 87 includes the subject matter of any one of Examples 78-86, and optionally, comprising receiving the Peer to Peer discovery frame over a social channel, and receiving the multicast transmission over another channel different from the social channel Example 88 includes the subject matter of any one of Examples 78-87, and optionally, comprising receiving the multicast transmission without establishing a Peer to Peer group with the second device.

Example 89 includes the subject matter of any one of Examples 78-88, and optionally, comprising receiving the multicast transmission, even when the first wireless device is not a Peer to Peer client in a Peer to Peer group.

Example 90 includes the subject matter of any one of Examples 78-89, and optionally, wherein the discovery frame comprises a Neighbor Awareness Network (NAN) Service Discovery frame.

Example 91 includes the subject matter of Example 90, and optionally, wherein the address field comprises a NAN cluster address.

Example 92 includes a product including one or more tangible computer-readable non-transitory storage media comprising computer-executable instructions operable to, when executed by at least one computer processor, enable the at least one computer processor to implement a method at a wireless device, the method comprising generating a Peer to Peer discovery frame including at least one Multicast attribute, the Multicast Attribute including an address field and one or more attribute fields, the address field to indicate a plurality of devices; transmitting the Peer to Peer discovery frame; and transmitting multicast traffic to the plurality of devices according to the one or more attribute fields.

Example 93 includes the subject matter of Example 92, and optionally, wherein the one or more attribute fields include availability information to indicate at least one channel and one or more time slots, the method comprising transmitting the multicast traffic to the plurality of devices over the at least one channel during the one or more time slots.

Example 94 includes the subject matter of Example 93, and optionally, wherein the availability information is to indicate a first channel, a first time slot corresponding to the first channel, a second channel, and a second time slot corresponding to the second channel, the method comprising transmitting first multicast traffic over the first channel during the first time slot, and second multicast traffic over the second channel during the second time slot.

Example 95 includes the subject matter of any one of Examples 92-94, and optionally, wherein the one or more attribute fields include a Map control field, and an Availability intervals bitmap field.

Example 96 includes the subject matter of any one of Examples 92-95, and optionally, wherein the address field includes a Multicast group destination address field.

Example 97 includes the subject matter of any one of Examples 92-96, and optionally, wherein the Multicast attribute includes a Multicast source address to indicate an address to deliver multicast traffic to the plurality of devices.

Example 98 includes the subject matter of Example 97, and optionally, wherein the Multicast source address includes a Media Access Control (MAC) address of the radio.

Example 99 includes the subject matter of any one of Examples 92-98, and optionally, wherein the method comprises protecting the multicast traffic with a group key.

Example 100 includes the subject matter of Example 99, and optionally, wherein the group key comprises a Group Temporal Key (GTK), the one or more attribute fields include availability information to indicate at least one channel and one or more time slots, the method comprising determining the GTK based on messages communicated with the plurality of devices over the at least one channel during the one or more time slots.

Example 101 includes the subject matter of any one of Examples 92-100, and optionally, wherein the method comprises transmitting the Peer to Peer discovery frame over a social channel, and transmitting the multicast traffic over another channel different from the social channel Example 102 includes the subject matter of any one of Examples 92-101, and optionally, wherein the method comprises transmitting the multicast traffic without establishing a Peer to Peer group with the plurality of devices.

Example 103 includes the subject matter of any one of Examples 92-102, and optionally, wherein the method comprises transmitting the multicast traffic, even when the wireless device is not a Peer to Peer Group Owner (GO).

Example 104 includes the subject matter of any one of Examples 92-103, and optionally, wherein the discovery frame comprises a Neighbor Awareness Network (NAN) Service Discovery frame.

Example 105 includes the subject matter of Example 104, and optionally, wherein the address field comprises a NAN cluster address.

Example 106 includes a product including one or more tangible computer-readable non-transitory storage media comprising computer-executable instructions operable to, when executed by at least one computer processor, enable the at least one computer processor to implement a method at a first wireless device, the method comprising receiving a Peer to Peer discovery frame from a second wireless device, the Peer to peer discovery frame including at least one Multicast attribute, the Multicast Attribute including an address field to indicate a plurality of devices and one or more attribute fields, the plurality of devices including the first wireless device; and receiving multicast traffic from the second wireless device according to the one or more attribute fields.

Example 107 includes the subject matter of Example 106, and optionally, wherein the one or more attribute fields include availability information to indicate at least one channel and one or more time slots, the method comprising receiving the multicast traffic from the second wireless device over the at least one channel during the one or more time slots.

Example 108 includes the subject matter of Example 107, and optionally, wherein the availability information is to indicate a first channel, a first time slot corresponding to the first channel, a second channel, and a second time slot corresponding to the second channel, the method comprising receiving first multicast traffic over the first channel during the first time slot, and second multicast traffic over the second channel during the second time slot.

Example 109 includes the subject matter of any one of Examples 106-108, and optionally, wherein the one or more attribute fields include a Map control field, and an Availability intervals bitmap field.

Example 110 includes the subject matter of any one of Examples 106-109, and optionally, wherein the address field includes a Multicast group destination address field.

Example 111 includes the subject matter of any one of Examples 106-110, and optionally, wherein the Multicast attribute includes a Multicast source address to indicate an address to deliver multicast traffic to the plurality of devices.

Example 112 includes the subject matter of Example 111, and optionally, wherein the Multicast source address includes a Media Access Control (MAC) address of the second wireless device.

Example 113 includes the subject matter of any one of Examples 106-112, and optionally, wherein the multicast traffic is protected with a group key, the method comprising processing the multicast traffic using the group key.

Example 114 includes the subject matter of Example 113, and optionally, wherein the group key comprises a Group Temporal Key (GTK), the one or more attribute fields include availability information to indicate at least one channel and one or more time slots, the method comprising determining the GTK based on messages communicated with the second wireless device over the at least one channel during the one or more time slots.

Example 115 includes the subject matter of any one of Examples 106-114, and optionally, wherein the method comprises receiving the Peer to Peer discovery frame over a social channel, and receiving the multicast transmission over another channel different from the social channel Example 116 includes the subject matter of any one of Examples 106-115, and optionally, wherein the method comprises receiving the multicast transmission without establishing a Peer to Peer group with the second device.

Example 117 includes the subject matter of any one of Examples 106-116, and optionally, wherein the method comprises receiving the multicast transmission, even when the first wireless device is not a Peer to Peer client in a Peer to Peer group.

Example 118 includes the subject matter of any one of Examples 106-117, and optionally, wherein the discovery frame comprises a Neighbor Awareness Network (NAN) Service Discovery frame.

Example 119 includes the subject matter of Example 118, and optionally, wherein the address field comprises a NAN cluster address.

Example 120 includes an apparatus of wireless communication, the apparatus comprising means for generating a Peer to Peer discovery frame including at least one Multicast attribute, the Multicast Attribute including an address field and one or more attribute fields, the address field to indicate a plurality of devices; means for transmitting the Peer to Peer discovery frame; and means for transmitting multicast traffic to the plurality of devices according to the one or more attribute fields.

Example 121 includes the subject matter of Example 120, and optionally, wherein the one or more attribute fields include availability information to indicate at least one channel and one or more time slots, the apparatus comprising means for transmitting the multicast traffic to the plurality of devices over the at least one channel during the one or more time slots.

Example 122 includes the subject matter of Example 121, and optionally, wherein the availability information is to indicate a first channel, a first time slot corresponding to the first channel, a second channel, and a second time slot corresponding to the second channel, the apparatus comprising means for transmitting first multicast traffic over the first channel during the first time slot, and second multicast traffic over the second channel during the second time slot.

Example 123 includes the subject matter of any one of Examples 120-122, and optionally, wherein the one or more attribute fields include a Map control field, and an Availability intervals bitmap field.

Example 124 includes the subject matter of any one of Examples 120-123, and optionally, wherein the address field includes a Multicast group destination address field.

Example 125 includes the subject matter of any one of Examples 120-124, and optionally, wherein the Multicast attribute includes a Multicast source address to indicate an address to deliver multicast traffic to the plurality of devices.

Example 126 includes the subject matter of Example 125, and optionally, wherein the Multicast source address includes a Media Access Control (MAC) address of the radio.

Example 127 includes the subject matter of any one of Examples 120-126, and optionally, comprising means for protecting the multicast traffic with a group key.

Example 128 includes the subject matter of Example 127, and optionally, wherein the group key comprises a Group Temporal Key (GTK), the one or more attribute fields include availability information to indicate at least one channel and one or more time slots, the apparatus comprising means for determining the GTK based on messages communicated with the plurality of devices over the at least one channel during the one or more time slots.

Example 129 includes the subject matter of any one of Examples 120-128, and optionally, comprising means for transmitting the Peer to Peer discovery frame over a social channel, and transmitting the multicast traffic over another channel different from the social channel.

Example 130 includes the subject matter of any one of Examples 120-129, and optionally, comprising means for transmitting the multicast traffic without establishing a Peer to Peer group with the plurality of devices.

Example 131 includes the subject matter of any one of Examples 120-130, and optionally, comprising means for transmitting the multicast traffic, even when not performing the functionality of a Peer to Peer Group Owner (GO).

Example 132 includes the subject matter of any one of Examples 120-131, and optionally, wherein the discovery frame comprises a Neighbor Awareness Network (NAN) Service Discovery frame.

Example 133 includes the subject matter of Example 132, and optionally, wherein the address field comprises a NAN cluster address.

Example 134 includes an apparatus of wireless communication, the apparatus comprising means for receiving, at a first wireless device, a Peer to Peer discovery frame from a second wireless device, the Peer to peer discovery frame including at least one Multicast attribute, the Multicast Attribute including an address field to indicate a plurality of devices and one or more attribute fields, the plurality of devices including the first wireless device; and means for receiving at the first wireless device multicast traffic from the second wireless device according to the one or more attribute fields.

Example 135 includes the subject matter of Example 134, and optionally, wherein the one or more attribute fields include availability information to indicate at least one channel and one or more time slots, the apparatus comprising means for receiving the multicast traffic from the second wireless device over the at least one channel during the one or more time slots.

Example 136 includes the subject matter of Example 135, and optionally, wherein the availability information is to indicate a first channel, a first time slot corresponding to the first channel, a second channel, and a second time slot corresponding to the second channel, the apparatus comprising means for receiving first multicast traffic over the first channel during the first time slot, and second multicast traffic over the second channel during the second time slot.

Example 137 includes the subject matter of any one of Examples 134-136, and optionally, wherein the one or more attribute fields include a Map control field, and an Availability intervals bitmap field.

Example 138 includes the subject matter of any one of Examples 134-137, and optionally, wherein the address field includes a Multicast group destination address field.

Example 139 includes the subject matter of any one of Examples 134-138, and optionally, wherein the Multicast attribute includes a Multicast source address to indicate an address to deliver multicast traffic to the plurality of devices.

Example 140 includes the subject matter of Example 139, and optionally, wherein the Multicast source address includes a Media Access Control (MAC) address of the second wireless device.

Example 141 includes the subject matter of any one of Examples 134-140, and optionally, wherein the multicast traffic is protected with a group key, the apparatus comprising means for processing the multicast traffic using the group key.

Example 142 includes the subject matter of Example 141, and optionally, wherein the group key comprises a Group Temporal Key (GTK), the one or more attribute fields include availability information to indicate at least one channel and one or more time slots, the apparatus comprising means for determining the GTK based on messages communicated with the second wireless device over the at least one channel during the one or more time slots.

Example 143 includes the subject matter of any one of Examples 134-142, and optionally, comprising means for receiving the Peer to Peer discovery frame over a social channel, and receiving the multicast transmission over another channel different from the social channel.

Example 144 includes the subject matter of any one of Examples 134-143, and optionally, comprising means for receiving the multicast transmission without establishing a Peer to Peer group with the second device.

Example 145 includes the subject matter of any one of Examples 134-144, and optionally, comprising means for receiving the multicast transmission, even when the first wireless device is not a Peer to Peer client in a Peer to Peer group.

Example 146 includes the subject matter of any one of Examples 134-145, and optionally, wherein the discovery frame comprises a Neighbor Awareness Network (NAN) Service Discovery frame.

Example 147 includes the subject matter of Example 146, and optionally, wherein the address field comprises a NAN cluster address.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory, and a processor configured to cause a Neighbor Awareness Networking (NAN) device to:
   transmit a NAN Service Discovery Frame (SDF) to announce a multicast group of two or more NAN devices to communicate multicast traffic of a service, the NAN SDF comprising at least a first field to indicate the multicast group, and a second field to indicate one or more time slots and at least one channel; and
   communicate multicast traffic of the multicast group over the at least one channel during the one or more time slots.

2. The apparatus of claim 1 configured to cause the NAN device to transmit the NAN SDF during a Discovery Window (DW) of a plurality of DWs, and to communicate the traffic of the multicast group outside of the DWs.

3. The apparatus of claim 2, wherein the second field is to indicate a channel, which is different from a channel of the plurality of DWs.

4. The apparatus of claim 2, wherein the second field is to indicate one or more time slots outside time periods of the plurality of DWs.

5. The apparatus of claim 1, wherein the second field comprises an availability bitmap to indicate the one or more time slots.

6. The apparatus of claim 1, wherein the one or more time slots and the at least one channel are based on an availability of the NAN device.

7. The apparatus of claim 1, wherein the NAN device comprises a source device of the multicast group to deliver traffic from the source device to a plurality of devices.

8. The apparatus of claim 1 comprising Medium Access Control (MAC) logic, and Physical Layer (PHY) logic.

9. The apparatus of claim 1 comprising a radio.

10. The apparatus of claim 1 comprising one or more antennas.

11. A product comprising one or more tangible computer-readable non-transitory storage media comprising computer-executable instructions operable to, when executed by at least one processor, enable the at least one processor to cause a Neighbor Awareness Networking (NAN) device to:

transmit a NAN Service Discovery Frame (SDF) to announce a multicast group of two or more NAN devices to communicate multicast traffic of a service, the NAN SDF comprising at least a first field to indicate the multicast group, and a second field to indicate one or more time slots and at least one channel; and communicate multicast traffic of the multicast group over the at least one channel during the one or more time slots.

12. The product of claim 11, wherein the instructions, when executed, cause the NAN device to transmit the NAN SDF during a Discovery Window (DW) of a plurality of DWs, and to communicate the traffic of the multicast group outside of the DWs.

13. The product of claim 12, wherein the second field is to indicate a channel, which is different from a channel of the plurality of DWs.

14. The product of claim 12, wherein the second field is to indicate one or more time slots outside time periods of the plurality of DWs.

15. The product of claim 11, wherein the second field comprises an availability bitmap to indicate the one or more time slots.

16. The product of claim 11, wherein the one or more time slots and the at least one channel are based on an availability of the NAN device.

17. The product of claim 11, wherein the NAN device comprises a source device of the multicast group to deliver traffic from the source device to a plurality of devices.

18. An apparatus comprising a memory, and a processor configured to cause a first Neighbor Awareness Networking (NAN) device to:

process a NAN Service Discovery Frame (SDF) from a second NAN device, the NAN SDF to announce a multicast group of two or more NAN devices to communicate multicast traffic of a service, the NAN SDF comprising at least a first field to indicate the multicast group, and a second field to indicate one or more time slots and at least one channel; and communicate multicast traffic of the multicast group over the at least one channel during the one or more time slots.

19. The apparatus of claim 18 configured to cause the first NAN device to receive the NAN SDF during a Discovery Window (DW) of a plurality of DWs, and to communicate the traffic of the multicast group outside of the DWs.

20. The apparatus of claim 19, wherein the second field is to indicate a channel, which is different from a channel of the plurality of DWs.

21. The apparatus of claim 19, wherein the second field is to indicate one or more time slots outside time periods of the plurality of DWs.

22. The apparatus of claim 18, wherein the second field comprises an availability bitmap to indicate the one or more time slots.

23. The apparatus of claim 18, wherein the one or more time slots and at least one channel are based on an availability of the second NAN device.

24. The apparatus of claim 18, wherein the second NAN device comprises a source device of the multicast group to deliver traffic from the source device to a plurality of devices.

25. The apparatus of claim 18 comprising Medium Access Control (MAC) logic, and Physical Layer (PHY) logic.

26. The apparatus of claim 18 comprising a radio.

27. The apparatus of claim 18 comprising one or more antennas.

28. A product comprising one or more tangible computer-readable non-transitory storage media comprising computer-executable instructions operable to, when executed by at least one processor, enable the at least one processor to cause a first Neighbor Awareness Networking (NAN) device to:

process a NAN Service Discovery Frame (SDF) from a second NAN device, the NAN SDF to announce a multicast group of two or more NAN devices to communicate multicast traffic of a service, the NAN SDF comprising at least a first field to indicate the multicast group, and a second field to indicate one or more time slots and at least one channel; and communicate multicast traffic of the multicast group over the at least one channel during the one or more time slots.

29. The product of claim 28, wherein the instructions, when executed, cause the first NAN device to receive the NAN SDF during a Discovery Window (DW) of a plurality of DWs, and to communicate the traffic of the multicast group outside of the DWs.

30. The product of claim 29, wherein the second field is to indicate a channel, which is different from a channel of the plurality of DWs.

31. The product of claim 29, wherein the second field is to indicate one or more time slots outside time periods of the plurality of DWs.

32. The product of claim 28, wherein the second field comprises an availability bitmap to indicate the one or more time slots.

33. The product of claim 28, wherein the one or more time slots and at least one channel are based on an availability of the second NAN device.

34. The product of claim 28, wherein the second NAN device comprises a source device of the multicast group to deliver traffic from the source device to a plurality of devices.

* * * * *